United States Patent
Wang et al.

(10) Patent No.: US 9,841,781 B2
(45) Date of Patent: Dec. 12, 2017

(54) ASSEMBLED WEARABLE DEVICE

(71) Applicant: BOE TECHNOLOGY GROUP CO., LTD., Beijing (CN)

(72) Inventors: Xin Wang, Beijing (CN); Changlin Leng, Beijing (CN); Yefei Dong, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/744,653

(22) Filed: Jun. 19, 2015

(65) Prior Publication Data

US 2016/0252115 A1    Sep. 1, 2016

(30) Foreign Application Priority Data

Feb. 28, 2015   (CN) .......................... 2015 1 0091715

(51) Int. Cl.
*G06F 1/16*   (2006.01)
*A44C 5/02*   (2006.01)
*G06F 1/18*   (2006.01)

(52) U.S. Cl.
CPC .............. *G06F 1/1601* (2013.01); *A44C 5/02* (2013.01); *G06F 1/163* (2013.01); *G06F 1/1637* (2013.01); *G06F 1/188* (2013.01)

(58) Field of Classification Search
CPC ...... G06F 1/163; A44C 17/025; G04G 17/083
USPC ..................................... 361/679.03
See application file for complete search history.

(56) References Cited

U.S. PATENT DOCUMENTS

| | | | | |
|---|---|---|---|---|
| 1,373,395 A | * | 4/1921 | Allsopp .................. | A44C 5/02 59/80 |
| 1,641,797 A | * | 9/1927 | Batchelder ............... | A44C 5/02 59/80 |
| 1,844,132 A | * | 2/1932 | Lichtenfels .............. | A44C 5/02 59/80 |
| 1,860,186 A | * | 5/1932 | Kestenman ............. | A44C 5/02 24/615 |
| 2,055,541 A | * | 9/1936 | Kestenman ............. | A44C 5/02 59/80 |
| 2,079,400 A | * | 5/1937 | Einsele .................... | A44C 5/02 59/80 |

(Continued)

FOREIGN PATENT DOCUMENTS

| CN | 103546181 A | 1/2014 |
|---|---|---|
| CN | 204154899 U | 2/2015 |

OTHER PUBLICATIONS

First Chinese Office Action dated Feb. 15, 2017; Appln. 201510091715.7.

(Continued)

*Primary Examiner* — Adrian S Wilson
(74) *Attorney, Agent, or Firm* — Ladas & Parry LLP

(57) ABSTRACT

Embodiments of the present invention provide an assembled wearable device. The assembled wearable device comprises a first functional module, a second functional module and a connecting structure for connecting the first functional module and the second functional module, wherein the connecting structure comprises a first inserting member and a first receiving member matching each other, the first receiving member is configured for receiving the first inserting member so that the first inserting member is confined to the first receiving member in at least one direction.

15 Claims, 2 Drawing Sheets

(56) References Cited

U.S. PATENT DOCUMENTS

| | | | | |
|---|---|---|---|---|
| 3,690,064 | A * | 9/1972 | Pompeo | A44C 5/02 59/35.1 |
| 5,896,757 | A * | 4/1999 | Kharloubian | A44C 17/025 63/28 |
| 6,549,791 | B1 * | 4/2003 | Jeon | H04B 1/385 379/433.08 |
| 6,619,835 | B2 * | 9/2003 | Kita | A44C 5/0015 368/10 |
| 6,619,836 | B1 * | 9/2003 | Silvant | G04G 17/08 368/281 |
| 6,688,139 | B2 * | 2/2004 | Tschetter | A44C 17/025 63/15 |
| 6,711,886 | B1 * | 3/2004 | Kwan | A44C 5/02 59/79.1 |
| 7,201,021 | B2 * | 4/2007 | Hartgrove | A44C 9/003 63/29.1 |
| 2001/0043514 | A1 * | 11/2001 | Kita | A44C 5/0015 368/281 |
| 2002/0105778 | A1 * | 8/2002 | Harada | G06F 1/1601 361/679.03 |
| 2007/0279852 | A1 * | 12/2007 | Daniel | A44C 5/0007 361/679.03 |
| 2012/0138647 | A1 * | 6/2012 | Norling | A45F 5/00 224/267 |
| 2013/0152542 | A1 * | 6/2013 | Kaltenrieder | A44C 5/185 59/82 |
| 2014/0078694 | A1 * | 3/2014 | Wissmar | G04G 17/04 361/749 |

OTHER PUBLICATIONS

The Second Chinese Office Action dated Oct. 11, 2017; Appln. 201510091715.7.

* cited by examiner

US 9,841,781 B2

ASSEMBLED WEARABLE DEVICE

TECHNICAL FIELD

Embodiments of the invention relate to an assembled wearable device.

BACKGROUND

With the development of science and technology, people have higher requirements on the functions of a wearable device; an existing wearable device is usually integrated with many functions such as communication, entertainment and so on, to facilitate people making calls, listening to music, recording and so on at the time of movement. An assembled wearable device can further have respective functional modules disassembled and freely assembled according to the habits of users.

In an assembled wearable device of the related art, a connecting block and a functional module which are adjacent to each other are connected by screws, and such a connecting method results in an inconvenient operation when disassembling the functional module and the connecting block, affecting free assembly of the wearable device; in addition, the screws are small and easy to lose after disassembling.

SUMMARY OF THE INVENTION

Embodiments of the present invention provide an assembled wearable device, comprising a first functional module, a second functional module and a connecting structure for connecting the first functional module and the second functional module, wherein the connecting structure comprises a first inserting member and a first receiving member matching each other, the first receiving member is configured for receiving the first inserting member so that the first inserting member is confined to the first receiving member in at least one direction.

BRIEF DESCRIPTION OF THE DRAWINGS

In order to clearly illustrate the technical solution of the embodiments of the disclosure, the drawings of the embodiments or the drawings used in the related technical descriptions will be briefly described in the following; it is obvious that the described drawings are only related to some embodiments of the disclosure and thus are not limitative of the disclosure.

DESCRIPTION OF THE EMBODIMENTS

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the common meanings as understood by one of ordinary skill in the art to which the present invention belongs. The terms "first" "second" etc., which may be used in the description and the claims of the present invention, are not intended to indicate any sequence, number or importance, but merely to distinguish various components from one another. Also, the terms such as "a" "an" etc., are not intended to limit the number, but indicate the existence of at lease one. The term "a plurality of" refers to two or more. The terms "comprise" "comprising" "include," "including" etc., are intended to specify that the elements or the objects stated before these terms encompass the elements or the objects and equivalents thereof listed after these terms, but do not exclude other elements or objects. The phrases "connect", "connected", etc., are not intended to be limited to a physical connection or mechanical connection, but may include an electrical connection, directly or indirectly, internally or externally, detachably or integrally. "On" "under" "right" "left" and the like are only used to indicate relative position relationship, and when the position of the described object is changed, the relative position relationship may be changed accordingly. In the description of the invention, unless otherwise stated, "a plurality of" refers to two or more.

The embodiments of the present invention provide an assembled wearable device, for solving the problems of inconvenient operation and easy loss of parts when disassembling the functional module and the connecting block of the assembled wearable device in the related art, to facilitate free assembly of the wearable device.

Figure 1:
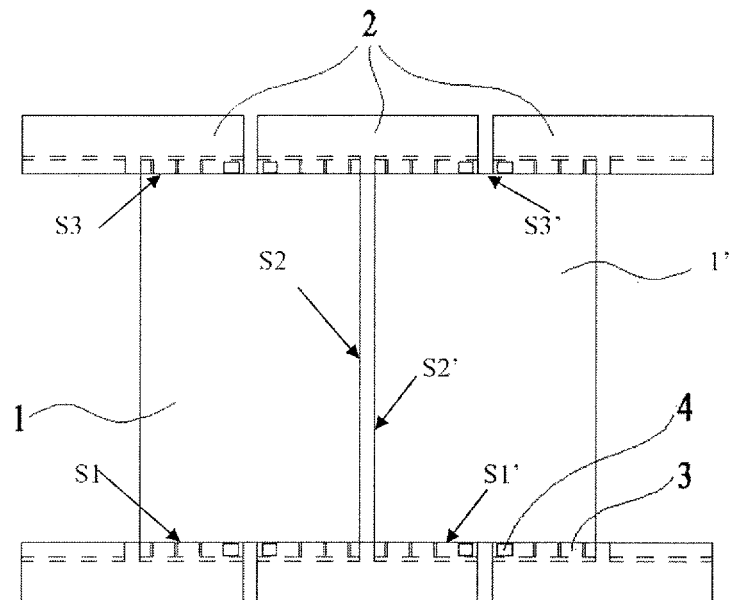
FIG. 1 is a structural schematic diagram of an assembled wearable device provided by an embodiment of the present invention.

An embodiment of the present invention provides an assembled wearable device. As shown in FIG. 1, the assembled wearable device comprises a plurality of functional modules 1, 1' (FIG. 1 only showing two of them). The plurality of functional modules 1, 1' are connected in series by a plurality of flexible connecting blocks 2 so as to form a ring, and the flexible connecting block 2 and the functional modules 1, 1' are insertion connected and magnetic attracted and combined by magnetic attraction of magnetic components 4.

In order to assemble the functional modules 1, 1' and the flexible connecting block 2 of the assembled wearable device provided by the embodiment of the present invention, the functional modules 1, 1' are inserted into the corresponding flexible connecting block 2, and meanwhile they are combined to one another by the magnetic component; Herein, an insertion connecting structures 3 comprising a slot 31 and an inserting bump 32 is used for connecting the functional modules 1, 1' and the flexible connecting block 2. As for disassembling, the slot 31 and the inserting bump 32 of the insertion connecting structures 3 are separated by overcoming magnetic attraction of the magnetic components; As compared with the connecting manner by using screws in related art, the operation is simple and convenient when assembling and disassembling the functional modules 1, 1' and the flexible connecting block 2 in the embodiment of the present invention, thereby facilitating free assembly of the wearable device; in addition, the assembled wearable device of the embodiment of the invention does not require any additional components to combine the functional modules 1, 1' and the flexible connecting block 2, so that there is no part completely separated from the wearable device after disassembling, thereby avoiding loss of part.

In order to make the connection between two adjacent functional modules 1, 1' more stable, the two adjacent functional modules 1, 1' are connected by two flexible connecting blocks 2. The two flexible connecting blocks 2 respectively connect ends S1, of the two adjacent functional modules 1, 1' with ends S3, S3' of the two adjacent functional modules 1, 1', so that the connection between the two adjacent functional modules 1, 1' is more stable.

Figure 2:
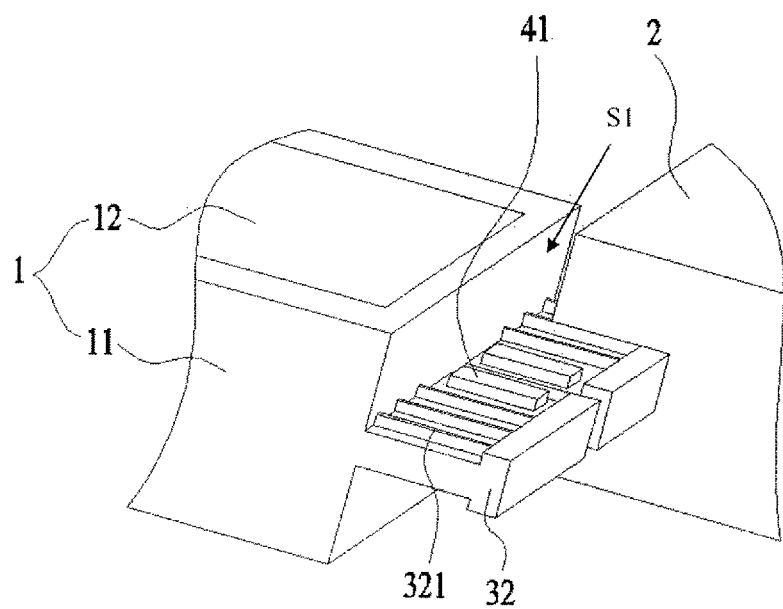
FIG. 2 is a schematic diagram showing connection of a functional module and a flexible connecting block in the assembled wearable device provided by the embodiment of the present invention.
Figure 3:
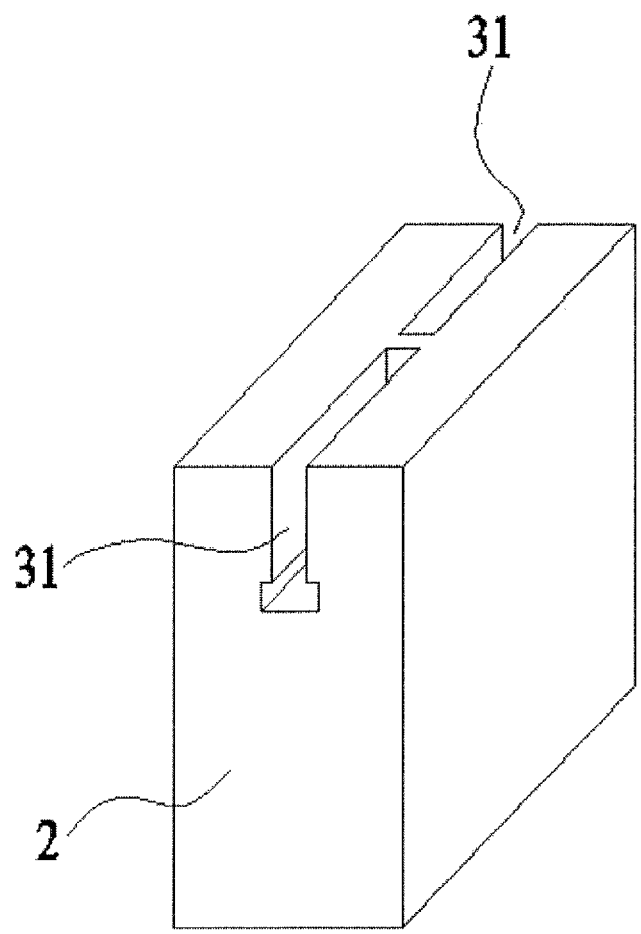
FIG. 3 is a structural schematic diagram of the flexible connecting block in the assembled wearable device provided by the embodiment of the present invention.

With reference to FIG. 1 to FIG. 3, the flexible connecting block 2 is provided with a slot 31, the end S1 of the functional module 1 is provided with an inserting bump 32, and the inserting bump 32 matches with the slot 31 for insertion connecting; Herein, insertion connecting structures 3 comprises the slot 31 and the inserting bump 32. In order to assemble the functional module 1 and the flexible connecting block 2, the inserting bump 32 disposed on the ends S1, S1' of the functional modules 1, 1' is inserted into the slot 31 disposed on the flexible connecting block 2; on the contrary, in order to disassemble the functional modules 1, 1' and the flexible connecting block 2, the inserting bump 32 is pulled out of the slot 31. Therefore, the assembling and disassembling operation is simple and convenient, and the connection is more stable.

With reference to FIG. 3, two slots 31 are provided on each flexible connecting block 2, the two slots 31 are respectively arranged to extend inwards from two opposite end faces of the flexible connecting block 2, and the inserting bumps 32 of the two adjacent functional modules 1, 1' are inserted into the two slots 31 of the flexible connecting block 2, respectively. Therefore, an assembling process of the assembled wearable device is, for example, as follows: the inserting bump 32 on the functional module 1 is inserted into the flexible connecting block 2 along the slot 31 from an end face of the flexible connecting block 2, and the inserting bump 32 on the other functional module 1' is inserted into the flexible connecting block 2 along the slot 31 from an opposite end face of the flexible connecting block 2, so that two adjacent functional modules 1, 1' are connected by one flexible connecting block 2, and it goes in the same way until more functional modules (not shown) are connected in series to form a ring, which improves the structural compactness of the wearable device.

In an example, the two slots 31 can be communicated thoroughly, and the inserting bumps 32 of the two functional modules 1, 1' adjacent to the flexible connecting block 2 are cooperatively inserted into the slot 31 from the two ends of the slot 31, respectively, therefore reducing the manufacturing process of the flexible connecting block 2, and lowering the manufacturing difficulty.

After the wearable device is assembled, respective component surfaces in contact with human body are smoothly connected, for improving comfort of the wearable device. In order to still ensure comfort of the wearable device after users freely assemble the functional modules according to their personal habits, the two slots 31 on each flexible connecting block 2 are disposed along a same straight line, and the two inserting bumps 32 on respective functional modules 1, 1' are also disposed along a same straight line, so that the respective component surfaces in contact with human body are still smoothly connected after freely assembling respective functional modules 1, which makes the appearance of the wearable device more neat, thus ensuring comfort of the wearable device. In addition, the structure of assembled wearable device is more stable to avoid torsion caused by pulling.

With reference to FIG. 2 and FIG. 3, in order to improve stability of connecting the functional modules 1, 1' and the flexible connecting block 2, the slot 31 is a T-shaped slot, i.e., has a T-shaped cross-section, the inserting bump 32 is a T-shaped block, i.e., has a T-shaped cross-section; after the T-shaped blocks 32 are inwardly inserted into the flexible connecting block 2 along the T-shaped slot 31 from an end face of the flexible connecting block 2, the functional modules 1, 1' can only be pulled out along a direction opposite to the inserting direction due to the mutual matching between the T-shaped block and the T-shaped slot, which prevents the functional modules 1, 1' from sliding out of the flexible connecting blocks 2 disposed on both sides thereof at least in a direction vertical to the inserting direction, thereby improving stability of connecting the functional modules 1, 1 and the flexible connecting blocks 2.

With reference to FIG. 2, the magnetic component 4 includes a first magnet 41 disposed on the inserting bump 32 and a second magnet (not shown) disposed in the slot 31; the first magnet 41 and the second magnet are mutually attracted, the attraction generated by the first magnet 41 and the second magnet makes the inserting connection between the inserting bump 32 and the slot 31 more quickly, and improves efficiency and precision of connecting the inserting bump 32 and the slot 31. After connection, the attraction generated between the first magnet 41 and the second magnet can prevent the functional modules 1, 1' from separating from the flexible connecting block 2 when the users are taking vigorous exercises, further improving stability of connecting the functional modules 1, 1' and the flexible connecting block 2.

The plurality of functional modules 1, 1' in the above-mentioned embodiment include, for example, a game functional module, a communication functional module, a camera functional module, a video functional module and a navigation functional module and so on. The wearable device integrated with these functional modules has more comprehensive functions, and is more convenient for use.

As shown in FIG. 2, for example, each of the functional modules 1, 1' includes a housing 11, a display screen 12 provided on a surface of the housing 11, a power source (not shown) and a main chip (not shown) provided inside the housing 11. The inserting bumps 32 on the ends of the housing 11 can be provided with electrode 321, and the inserting connection between the inserting bump 32 and the slot 31 on the flexible connecting block 2 facilitates compact connection of the functional modules.

A signal transmission circuit (not shown) can be arranged within the slot 31 of the flexible connecting block 2, the electrode 321 on the inserting bump 32 is connected with the signal transmission circuit in the slot 31, so that the signal can be transmitted between respective functional modules 1, 1'. Therefore, the assembled wearable device can realize various functions such as game, communication, photographing, navigation and so on.

For example, the assembled wearable device in the embodiment of the present invention is an assembled wristband.

In the above embodiment, the two adjacent functional modules 1, 1' can be regarded as being connected with each other via a connecting structure, the connecting structure including a first inserting member and a first receiving member matching with each other; the inserting bumps 32 on the two functional modules 1, 1' can respectively serve as first and second inserting portions of the first inserting member respectively, and the flexible connecting block 2 can serve as the first receiving member. The inserting bumps 32 are configured for inserting into the slot 31 on the flexible connecting block 2 along a insertion direction. The flexible connecting block 2 receives the inserting bumps 32 on the two functional modules 1, 1' and prevents the inserting bump 32 detaching therefrom at least in a direction other than the inserting direction.

In another embodiment, the inserting bump 32 serving as a first inserting member of a connecting structure can be disposed on an end S2 of the functional module 1 in FIG. 1 and protrude towards the functional module 1', in FIG. 1, an end S2' of the functional module 1' can be provided with a first receiving member with a slot for receiving the inserting bump 32 formed thereon. The inserting bump 32 is confined to the first receiving member at least in a direction of connecting the two functional modules 1, 1'. In other words, the connecting structure including the first inserting member and the first receiving member also can be disposed on the ends of two functional modules 1 which face each other.

In addition, in the above embodiments, the magnetic component 4 as well as the T-shaped slot 31 and the T-shaped inserting bump 32 are both used for confining the inserting bump 32 to the slot 31, but it can be understood that in other embodiments only magnetic component or only mutually engaged slot and inserting bump are used for preventing the inserting bump from falling out of the slot.

According to the above description, the embodiments according to the present disclosure at least can provide structures as follows:

(1) An assembled wearable device, comprising a first functional module, a second functional module and a connecting structure for connecting the first functional module and the second functional module, wherein the connecting structure comprises a first inserting member and a first receiving member matching each other, the first receiving member is configured for receiving the first inserting member so that the first inserting member is confined to the first receiving member in at least one direction.

(2). The assembled wearable device according to (1), wherein, the first inserting member is disposed on a side of the first functional module facing the second functional module, and the first receiving member is disposed on a side of the second functional module facing the first functional module.

(3). The assembled wearable device according to (1), wherein, the first inserting member includes a first inserting portion disposed on the first functional module and a second inserting portion disposed on the second functional module, and the first receiving member is disposed independently of the first and second functional modules.

(4). The assembled wearable device according to (3), wherein, the first inserting portion of the first inserting member is disposed on one outer side of the first functional module, the one outer side of the first functional module being adjacent to an inner side of the first functional module facing the second functional module; the second inserting portion of the first inserting member is disposed on one outer side of the second functional module, the one outer side of the second functional module being adjacent to an inner side of the second functional module facing the first functional module.

(5). The assembled wearable device according to (4), wherein, the connecting structure further includes a second inserting member and a second receiving member which are corresponding to each other, the second inserting member including a first inserting portion disposed on the first functional module and a second inserting portion disposed on the second functional module, the second receiving member being disposed independently of the first and second functional modules; and the first inserting portion of the second inserting member is disposed on an other outer side of the first functional module, the other outer side of the first functional module being adjacent to an inner side of the first functional module facing the second functional module and being opposite to the one outer side of the first functional module; the second inserting portion of the second inserting member is disposed on an other outer side of the second functional module, the other outer side of the second functional module being adjacent to an inner side of the second functional module facing the first functional module and being opposite to the one outer side of the second functional module.

(6). The assembled wearable device according to (1), wherein, the first inserting member includes a strip-shaped bump, and the first receiving member is provided with a slot, the strip-shaped bump being confined to the slot in the at least one direction.

(7). The assembled wearable device according to (3), wherein, both the first inserting portion and the second inserting portion are strip-shaped bumps, the first receiving member is provided with first and second slots, the first inserting portion and the second inserting portion being confined to the first and second strip-shaped slots in the at least one direction respectively.

(8). The assembled wearable device according to (7), wherein, the first and second slots extend toward each other from two opposite end faces of the first receiving member respectively.

(9). The assembled wearable device according to (8), wherein, the first and second slots are communicated with each other.

(10). The assembled wearable device according to (8), wherein, the first and second slots are disposed along a same straight line.

(11). The assembled wearable device according to (6), wherein, the slot has a T-shaped cross-section and the strip-shaped bump has a T-shaped cross-section.

(12). The assembled wearable device according to (1), wherein, the first inserting member and the first receiving member are combined by a magnetic component, the magnetic component including a first magnetic member disposed on an inserting bump and a second magnetic member disposed in the slot, and the first magnetic member and the second magnetic member are attracted to each other.

(13). The assembled wearable device according to (1), wherein, the first and second magnetic members are first and second magnets respectively.

(14). The assembled wearable device according to (6), wherein, the first functional module includes a housing, a display screen provided on a surface of the housing, a power source and a main chip provided inside the housing, and the inserting bump is provided with an electrode.

(15). The assembled wearable device according to (14), wherein, a signal transmission circuit is arranged in the slot of the first receiving member, the electrode on the first inserting member being connecting with the signal transmission circuit in the slot of the first receiving member.

(16). The assembled wearable device according to (1), wherein, the assembled wearable device is an assembled wristband.

(17). The assembled wearable device according to (1), wherein the connecting structure is flexible.

(18). The assembled wearable device according to (1), wherein the first and second functional modules are flexible.

Although the disclosure has been described above in great detail by using general descriptions and specific embodiments, on the basis of the disclosure, various changes and improvements may be made to the disclosure, which is apparent to those skilled in the art. Therefore, all such changes and improvements without departing from the spirit of the disclosure, are within the scope of the claims of the disclosure.

What is claimed is:

1. An assembled wearable device, comprising a first functional module, a second functional module and a connecting structure for connecting the first functional module and the second functional module, wherein the connecting structure comprises a first inserting member and a first receiving member matching each other, the first inserting member includes a first inserting portion disposed on the first functional module and a second inserting portion disposed on the second functional module, the first receiving member is configured for receiving the first inserting portion and the second inserting portion of the first inserting member so that the first inserting portion and the second inserting portion of the first inserting member are confined to the first receiving member in at least one direction, the first receiving member is of single piece, wherein, the first inserting member includes a strip-shaped bump, and the first receiving member is provided with a slot, the strip-shaped bump being confined to the slot in the at least one direction.

2. The assembled wearable device according to claim 1, wherein, the first inserting portion of the first inserting member is disposed on one outer side surface of the first functional module, the one outer side surface of the first functional module being adjacent to an inner side surface of the first functional module facing the second functional module; the second inserting portion of the first inserting member s disposed on one outer side surface of the second functional module, the one outer side surface of the second functional module being adjacent to an inner side surface of the second functional module facing the first functional module.

3. The assembled wearable device according to claim 2, wherein, the connecting structure further includes a second inserting member and a second receiving member which are corresponding to each other, the second inserting member including another first inserting portion disposed on the first functional module and another second inserting portion disposed on the second functional module, the second receiving member being disposed independently of the first and second functional modules; and the another first inserting portion of the second inserting member is disposed on another outer side surface of the first functional module, the other outer side surface of the first functional module being adjacent to the inner side surface of the first functional module facing the second functional module and being opposite to the one outer side surface of the first functional module; the another second inserting portion of the second inserting member is disposed on another outer side surface of the second functional module, the other outer side surface of the second functional module being adjacent to the inner side surface of the second functional module facing the first functional module and being opposite to the one outer side surface of the second functional module.

4. The assembled wearable device according to claim 1, wherein, both the first inserting portion and the second inserting portion are strip-shaped bumps, the first receiving member is provided with first and second slots, the first inserting portion and the second inserting portion being confined to the first and second strip-shaped slots in the at least one direction respectively.

5. The assembled wearable device according to claim 4, wherein, the first and second slots extend toward each other from two opposite end faces of the first receiving member respectively.

6. The assembled wearable device according to claim 5, wherein, the first and second slots are communicated with each other.

7. The assembled wearable device according to claim 5, wherein, the first and second slots are disposed along a same straight line.

8. The assembled wearable device according to claim 1, wherein, the slot has a T-shaped cross-section and the strip-shaped bump has a T-shaped cross-section.

9. The assembled wearable device according to claim 1, wherein, the first inserting member and the first receiving member are combined by a magnetic component, the magnetic component including a first magnetic member disposed on an inserting bump and a second magnetic member disposed in the slot, and the first magnetic member and the second magnetic member are attracted to each other.

10. The assembled wearable device according to claim 9, wherein, the first and second magnetic members are first and second magnets respectively.

11. The assembled wearable device according to claim 1, wherein, the first functional module includes a housing, a display screen provided on a surface of the housing, a power source and a main chip provided inside the housing, and the inserting bump is provided with an electrode.

12. The assembled wearable device according to claim 11, wherein, a signal transmission circuit is arranged in the slot of the first receiving member, the electrode on the first inserting member being connecting with the signal transmission circuit in the slot of the first receiving member.

13. The assembled wearable device according to claim 1, wherein, the assembled wearable device is an assembled wristband.

14. The assembled wearable device according to claim 1, wherein the connecting structure is flexible.

15. The assembled wearable device according to claim 1, wherein the first and second functional modules are flexible.

* * * * *